(12) United States Patent
Hanzawa et al.

(10) Patent No.: US 6,377,056 B1
(45) Date of Patent: Apr. 23, 2002

(54) ELECTROSTATIC CAPACITANCE TYPE DYNAMICAL QUANTITY SENSOR

(75) Inventors: Keiji Hanzawa, Ibaraki; Masahiro Matsumoto; Satoshi Shimada, both of Hitachi; Akihiko Saito, Hatano; Yasuo Onose, Tokai-mura; Norio Ichikawa, Mito; Junichi Horie; Seiji Kuryu, both of Hitachinaka, all of (JP)

(73) Assignees: Hitachi, Ltd., Tokyo; Hitachi Car Engineering Co., Ltd., Hitachinaka, both of (JP)

( * ) Notice: Subject to any disclaimer, the term of this patent is extended or adjusted under 35 U.S.C. 154(b) by 0 days.

(21) Appl. No.: 09/384,289

(22) Filed: Aug. 26, 1999

(30) Foreign Application Priority Data

Aug. 26, 1998 (JP) .......................................... 10-240434

(51) Int. Cl.[7] .......................... G01R 27/26; G01R 31/12
(52) U.S. Cl. ...................................... 324/678; 324/548
(58) Field of Search .............................. 324/678, 658, 324/676, 677, 679, 548

(56) References Cited

U.S. PATENT DOCUMENTS

| 4,743,836 A | 5/1988 | Grzybowski et al. |
| 5,048,165 A | 9/1991 | Cadwell |
| 5,659,254 A | * 8/1997 | Matsumoto et al. ........ 324/678 |
| 5,821,421 A | 10/1998 | Le Reverend |

FOREIGN PATENT DOCUMENTS

| EP | 0 783 109 A1 | 7/1997 |
| JP | 4-329371 | 11/1992 |
| JP | 5-18990 | 1/1993 |
| JP | 7-50789 | 5/1995 |

OTHER PUBLICATIONS

*Sensors and Actuators A60*, vol. A60 Nos. 1–3, pp. 32–36 entitled Electrostatic actuation as a self-testing method for silicon pressure sensors.

* cited by examiner

*Primary Examiner*—Safet Metjahic
*Assistant Examiner*—J. Kerveros
(74) *Attorney, Agent, or Firm*—Crowell & Moring LLP

(57) ABSTRACT

Dynamic quantitative displacement is converted stably and straight into voltage (D.C. output) by using a high speed detection driving frequency without restricting a response of an operational amplifier. When a dynamic quantity detection electrostatic capacitance changes according to a dynamic quantity, electric charges stored in this element and in a reference electrostatic capacitance become unbalanced to produce a difference value, and an output of an operational amplifier changes according to the difference in electric charge quantity. However, the output becomes finally stable when the electric charges in the dynamic quantity detection electrostatic capacitance and in the reference electrostatic capacitance become equal. The output is proportional to a reciprocal of the dynamic quantity detection electrostatic capacitance and it is a D.C. voltage. Further, output without depending on integration feedback capacitance (feedback condenser) CF can be obtained.

5 Claims, 5 Drawing Sheets

ELECTROSTATIC CAPACITANCE TYPE DYNAMICAL QUANTITY SENSOR

BACKGROUND OF THE INVENTION

The present invention relates to an electrostatic capacitance type dynamic quantity sensor for detecting a dynamic quantity such as pressure, acceleration, etc.

As an example of conventional pressure sensors, there is an electrostatic capacitance type pressure sensor of surface device processing type as disclosed in JP B 7-50789, for instance. This pressure sensor is formed by forming a first electrode (fixed electrode) by diffusing impurities on a monocrystal silicon substrate, and arranging a second electrode (movable electrode) of diaphragm shape formed of poycrystal silicon having conductivity on the monocrystal silicon substrate so as to oppose the first electrode with an air gap therebetween, whereby pressure induced displacement of the second electrode changes the electrostatic capacitance, thereby allowing detection of the pressure.

Figure 7:
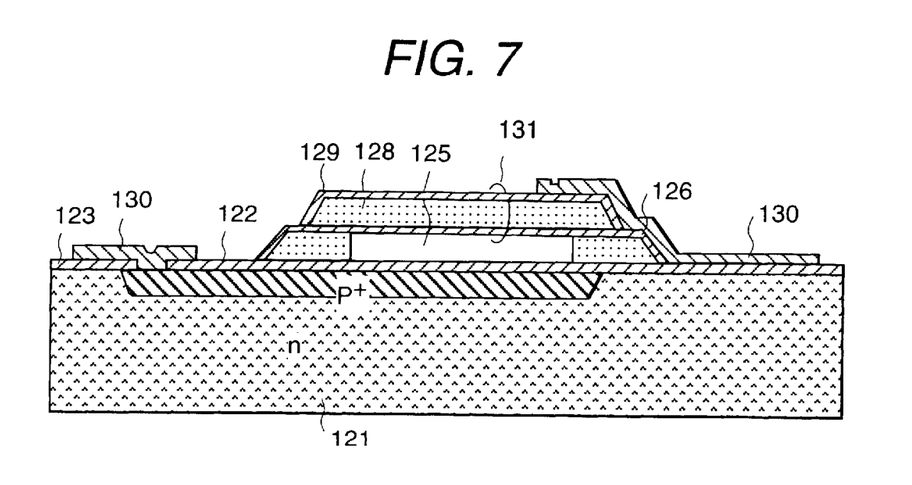
FIG. 7 is a sectional view of a conventional electrostatic capacitance type sensor.

FIG. 7 shows a section of a pressure detecting portion of the above-mentioned electrostatic capacitance type pressure sensor.

As shown in FIG. 7, a fixed electrode 122 is formed as a diffusion layer on a monocrystal silicon substrate 121, and a movable electrode (diaphragm) 131 is arranged above a protective film 123 and an air gap 125. The movable electrode 131 is composed of protective films 126, 129 of the nitrified film or the like and a conductive layer 128 of polycrystal silicon.

Signals (electric signals) of electrostatic capacitance between the movable electrode 131 and the fixed electrode 122 are taken out through aluminum wiring or the like. Assuming that an opposing surface area between the movable electrode 131 and the fixed electrode 122 is S and a distance of air gap between the fixed and movable electrodes 122, 131 is d, an electrostatic capacitance value $C_s$ of this capacitance conversion element is expressed by the following equation (1)

$$C_s = \epsilon_0 \cdot S/d \qquad (1)$$

where $\epsilon_0$ is dielectric constant in vacuum.

When pressure is applied onto the movable electrode 131, the air gap d between the fixed electrode 122 and the movable electrode 131 changes and the sensor capacitance $C_s$ changes. However, in the case where the capacitance $C_s$ is converted into an electric signal without modification of the above equation (1), the larger the sensitivity is made (the larger the distance d is changed) the larger is the degree of non-linearity of characteristics of change in the capacitance $C_s$ to the pressure inputted. Therefore, even if one tries to make a larger change in electrostatic capacitance to input pressure in order to achieve both of the electrostatic capacitance sensor small in size and improving a S/N ratio, the above-mentioned non-linear characteristic becomes a bar to realizing it.

Further, since the electrode is formed on the silicon substrate (in this case, it is formed by diffusion), the floating capacitance between the fixed electrode 122 and the silicon substrate 121 and between the movable electrode 131 or the wiring 130 and the silicon substrate 121 becomes large relative to the sensor capacitance $C_s$.

As a method of solving the non-linear characteristic problem of the electric signal, a system of obtaining an output proportional to a reciprocal of the electrostatic capacitance $C_s$ has been already proposed, for example, it is a circuit disclosed in Sensors and Actuators A 60 (1997) page 32 to 36. This is constructed so that a circuit for converting electrostatic capacitance changing by pressure is constructed by integration feedback capacitance of an operation amplifier, whereby an electric charge charged onto the integration feedback capacitance is converted into a pressure signal.

Figure 8:
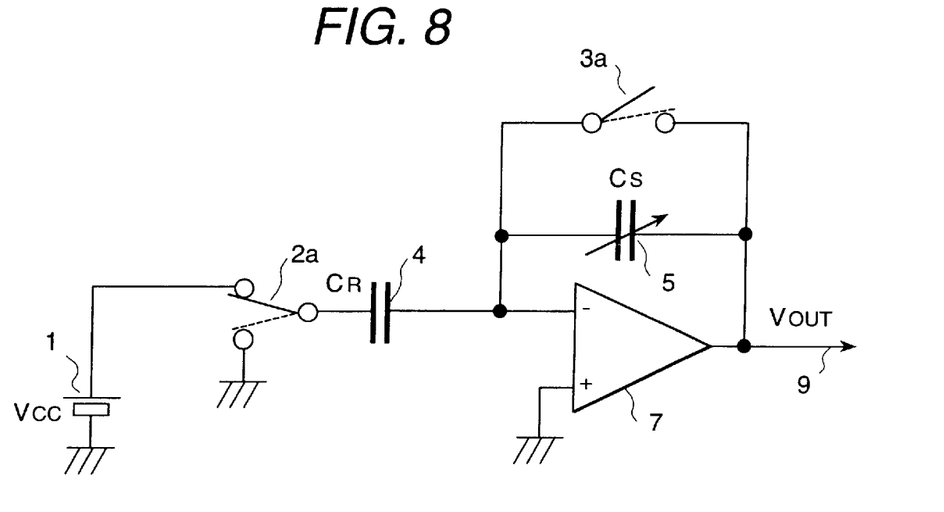
FIG. 8 is a diagram of a conventional circuit.

FIG. 8 shows the conventional circuit. In FIG. 8, a reference (standard) number 1 denotes a constant voltage source, 2a and 3a each denote a changeover switch, 4 denotes a reference electrostatic capacitance element the capacitance $C_R$ of which is fixed, 5 denotes a dynamical quantity detecting electrostatic capacitance element which is formed by a movable electrode and a fixed electrode and in which the electrostatic capacitance, that is, $C_s$ changes according to a dynamic quantity and 7 denotes an operational amplifier.

The reference electrostatic capacitance element 4 is connected to a reverse input terminal of the operational amplifier 7, and the dynamic quantity detecting electrostatic capacitance element 5 (electrostatic capacitance $C_s$) is provided in a feedback circuit between the reverse input terminal and an output terminal of the operational amplifier. The switches 2a, 3a are elements of a charge discharge circuit of the electrostatic capacitance $C_R$, $C_s$, and positioned at places of solid lines (in FIG. 8) when timing is φ1 and positioned at places of broken lines (in FIG. 8) when timing is φ1B.

According to this circuit, when timing is φ1, a voltage value Vcc of the constant voltage source 1 is applied to the reference electrostatic capacitance element 4 through the switch 2a, and charged charges are integrated in the dynamic quantity detecting electrostatic capacitance element 5. When timing is φ1B, the charges charged in the reference electrostatic capacitance element 4 are discharged through the switch 2a and the charges charged in the dynamic quantity detecting electrostatic capacitance are discharged through the switch 3a. By repeating the above-mentioned two modes, pulse like output signals are obtained at the output terminal 9.

Output Vout of the circuit is expressed by the following equation (2)

$$\text{Vout} = (C_R/C_s)\text{Vcc} = -(S_R d_s/S_s d_R)\text{Vcc} \qquad (2)$$

where $S_s$ denotes an area of the dynamic quantity detecting electrostatic capacitance element, $d_s$ denotes a distance (air gap) between the electrodes of the dynamic quantity detecting electrostatic capacitance element, $S_R$ denotes an area of the reference electrostatic capacitance element and $d_R$ denotes a distance (air gap) between the electrodes of the reference electrostatic capacitance element.

Accordingly, since it is constructed so that output voltage changes proportionally to a reciprocal of capacitance $C_s$ of the dynamic quantity detecting electrostatic capacitance element, that is, proportionally to a change of an air gap $d_s$, the output becomes an excellent characteristic without non-linearity in principal. Such a circuit is disclosed in JP A 4-329371 and JP A 5-18990, for example.

In this case, electrostatic capacitance $C_s$ for dynamic quantity detection has turned to be integration feedback capacitance of the operational amplifier, so that driving frequency for detection is restricted according to response speed of the operational amplifier. In order to precisely convert very small capacitance (1 pF or less) into an electric signal, it is necessary to detect dynamic quantity by high speed detection driving frequency (several hundreds kHz or higher). However, in the event that the detection driving frequency is restricted according to response speed of the operational amplifier, as mentioned above, a high speed operational amplifier is needed to detect capacitance at high frequency and with high precision, which is increases the cost and makes large in size.

Further, where an element of large floating capacitance (as shown in the first prior art) is driven, since the floating capacitance becomes a bar to improving on the response of the operational amplifier and stability, finally, the conventional sensor is not suitable for detection of very small capacitance with high precision. Further, in order to obtain D.C. output, it is necessary to add a sample and hold circuit to a rear stage.

Further, JP A 6-507723 (Laid-open PCT application) discloses a pressure measurement apparatus in which a ratio of a difference between sensor capacitance $C_s$ and reference capacitance $C_R$ is taken by reference capacitance $C_f$ divided of an electrode displaced by pressure. Transmission function F deriving pressure by capacitance measurement in this case is expressed by the following equation (3):

$$F=(C_s-C_R)/C_f \tag{3}$$

This prior art intends to compensate an error portion not completed to correct by 1/C function, or non-linearity by dividing an electrode of electrostatic capacitance changing by pressure (in other words, division of the capacitance into $C_s$ and $C_f$). In this case, also, since feedback integration capacitance $C_f$ influences an output of dynamic quantity detection, a high speed response operational amplifier is needed to detect very small capacitance at high frequency and with high precision, and a sample and hold circuit, etc. are needed at a rear stage of the capacitance detection circuit to take out the output as direct current.

SUMMARY OF THE INVENTION

The present invention is made by noticing the above-mentioned various problems, and an object of the present invention is basically to realize an electrostatic capacitance type dynamic quantity sensor which is able to detect very small electrostatic capacitance (dynamic quantitative displacement) by using high speed detection driving frequency without restriction of response of an operational amplifier, stably and at high speed without influence of floating capacitance and by converting it straightly into voltage. Further, another object of the invention is to provide an electrostatic capacitance type dynamic quantity sensor which is able to obtain D.C. output without adding a sample and hold circuit at a rear stage.

The present invention is constructed basically as follows. As for symbols added to elements constructing according to the present invention, symbols used for an embodiment of FIG. 1 are used here for convenience.

Figure 1:
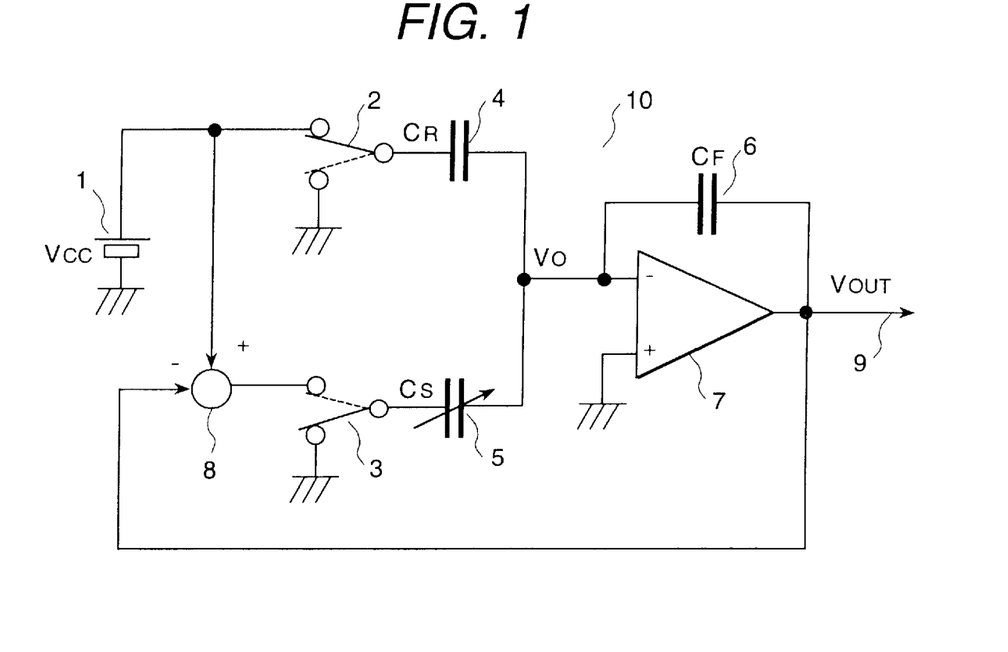
FIG. 1 is a diagram of a circuit of an electrostatic capacitance type dynamic quantity sensor of a first embodiment of the present invention.

That is, a sensor according to the present invention comprises a dynamic quantity detecting electrostatic capacitance element 5, of which the electrostatic capacitance $C_s$ changes according to a dynamic quantity, a reference electrostatic capacitance element 4 forming reference electrostatic capacitance $C_R$ and a capacitance detection circuit (it corresponds to an integration feedback capacitance $C_F$ and an operational amplifier 7 in FIG. 1) outputting a dynamic quantity signal proportional to a reciprocal of electrostatic capacitance $C_s$ of the dynamic quantity detecting electrostatic capacitance element 5. The sensor is characterized in that the circuit is constructed so that when the dynamic quantity detecting electrostatic capacitance element 5 displaced according to a dynamic quantity, electric charge quantities charged between the dynamic quantity detecting electrostatic capacitance element 5 and the reference electrostatic capacitance 4 become unbalanced to produce a difference therebetween, the output Vout of the capacitance detecting circuit changes according to the difference in electric charge, and a charge and discharge circuit (which corresponds to a constant voltage power source 1, an adder 8, and changeover switches 2, 3 in FIG. 1) is operated so that, using the output Vout of the capacitance detecting circuit, the output changes until electric charge quantities of the dynamic quantity detecting electrostatic capacitance element 5 and the reference electrostatic capacitance 4 become equal to each other.

According to the above construction, when the dynamic quantity detecting electrostatic capacitance element 5 displaces according to a dynamic quantity, electric charge quantities charged between the dynamic quantity detecting electrostatic capacitance element 5 and the reference electrostatic capacitance 4 become unbalanced to produce a difference therebetween, and the output Vout of the capacitance detecting circuit changes according to the difference in electric charge, however, to conclude (details will be explained in the description of embodiments of the invention), finally, the output Vout becomes stable at a value at which electric charge quantities of the dynamic quantity detecting electrostatic capacitance element 5 and the reference electrostatic capacitance 4 are equal to each other. The output Vout is proportional to a reciprocal of electrostatic capacitance $C_s$ for dynamic quantity detection and it is D.C. voltage. Further, in the case where the output Vout becomes stable at a value at which electric charge quantities of the dynamic quantity detecting electrostatic capacitance element 5 and the reference electrostatic capacitance 4 are equal to each other, even if an operational amplifier 7 with integration feedback capacitance (condenser for feedback) $C_F$, output independent from the integration feedback capacitance value is obtained.

DESCRIPTION OF EMBODIMENTS OF THE PRESENT INVENTION

Embodiments of the present invention will be explained, referring to FIGS. 1 to 6.

First of all, a first embodiment of the invention will be described, referring to FIGS. 1 to 5.

As shown in FIG. 1, an electrostatic capacitance type dynamic quantity sensor is composed of a constant voltage source 1, changeover switches 2, 3, a reference electrostatic capacitance element 4, a dynamic quantity detecting electrostatic capacitance element 5, an integration feedback capacitance element (feedback condenser) 6, an operational amplifier 7, an adder 8 and an output terminal 9.

The reference electrostatic capacitance element (fixed condenser) 4 forms a fixed reference (standard) electrostatic capacitance $C_R$. The dynamic quantity detecting electrostatic capacitance element (variable condenser) 5 changes its electrostatic capacitance $C_s$ according to a dynamic quantity such as pressure. Hereunder, the dynamic quantity detecting electrostatic capacitance element 5 is called a dynamic quantity detection element and the reference electrostatic capacitance element is called a reference element, for convenience.

The reference element 4 and the dynamic quantity detecting element 5 are connected to each other in series through a common connection line and connected to the reverse input terminal of the operational amplifier 7 through the common connection line. A non-reverse input terminal of the operational amplifier 7 is grounded. A feedback electrostatic capacitance element (fixed condenser) 6 is connected between an output terminal and the reverse input terminal of the operational amplifier 7. Hereunder, the feedback electrostatic capacitance element 6 is called a feedback condenser 6. The feedback condenser 6 and the operational amplifier 7 are the main elements of a capacitance detection circuit.

A plus (+)side of the constant voltage source 1 is connected to the reference element 4 through the changeover switch 2, and the plus (+) side of the constant voltage source 1 is connected to an input side of the adder 8. The adder 8 takes a difference between an output Vout of the operational amplifier 7 and the constant voltage source 1. An output side of the adder 8 is connected to the dynamic quantity detecting element 5 through the changeover switch 3.

In this embodiment, the switch 2 and the switch 3 are operated at reverse phase, and are switched alternately at high speed via high frequency pulses. When electrostatic capacitance $C_S$ and $C_R$ are equal to each other, current does not flow into the feedback condenser 6 (both output Vo and output Vout are 0 V). When the electrostatic capacitance $C_S$ becomes larger than the electrostatic capacitance $C_R$, more charge current flows into the electrostatic capacitance $C_S$ more by the difference in capacitance, a differential between electric charge amount charged in $C_S$ and an electric charge quantity charged in $C_R$ is integrated in the feedback condenser 6 (capacitance $C_F$) and outputted (output Vout changes according to a difference in electric charge between a quantity of the dynamic quantity detecting element 5 and a quantity of the reference element 4), however, since there is the adder 8, finally, the electric charge quantities becomes balanced at a value at which the electric charge quantities of the dynamic quantity detecting element 5 and the reference element 4 become equal to each other, and this becomes the direct current output voltage Vout.

The output Vout at this time is expressed by the following equation (4):

$$\text{Vout} = (1 - C_R/C_S)\text{Vcc} \tag{4}$$

Figure 2:
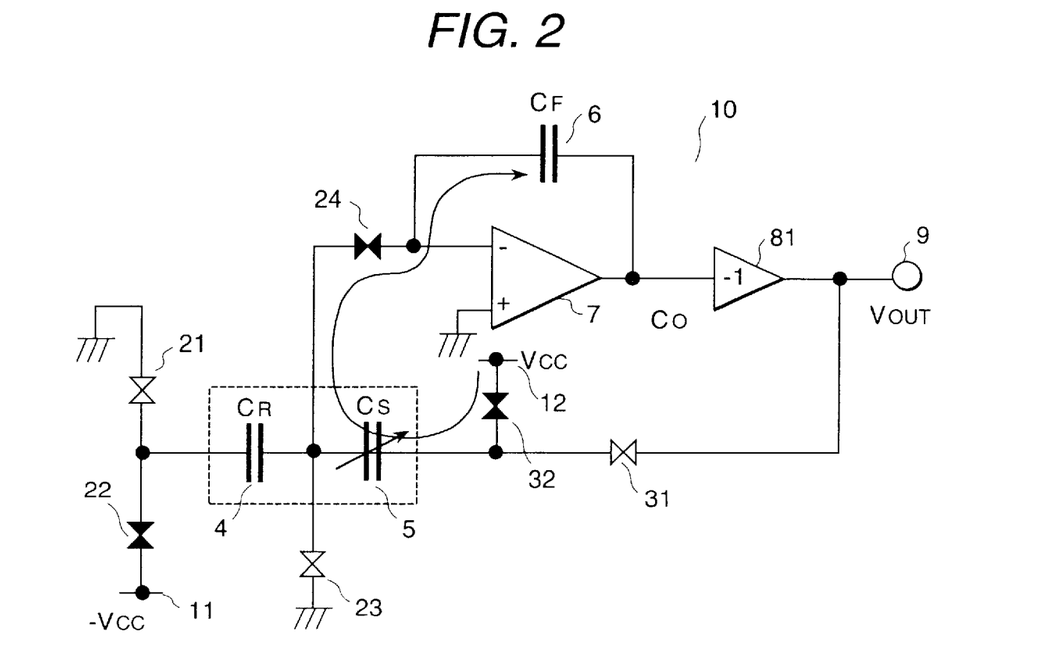
FIG. 2 is a detailed diagram of an equivalent circuit to that of the circuit of FIG. 1.
Figure 3A:
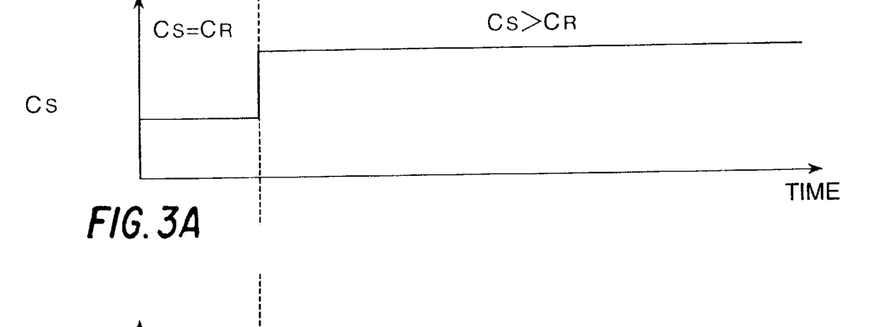
FIG. 3 is a timing chart showing the operation of the first embodiment.
Figure 3B:
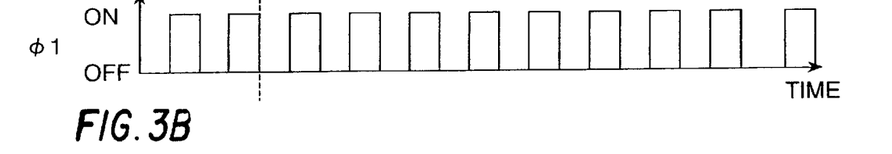
Figure 3C:
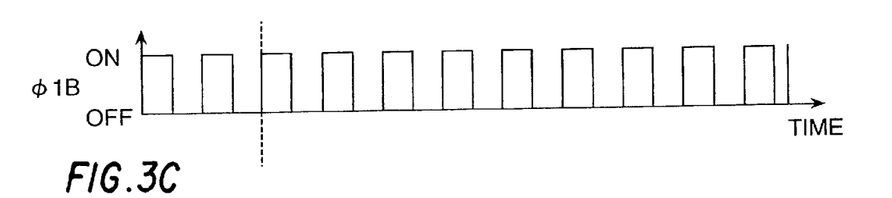
Figure 3D:
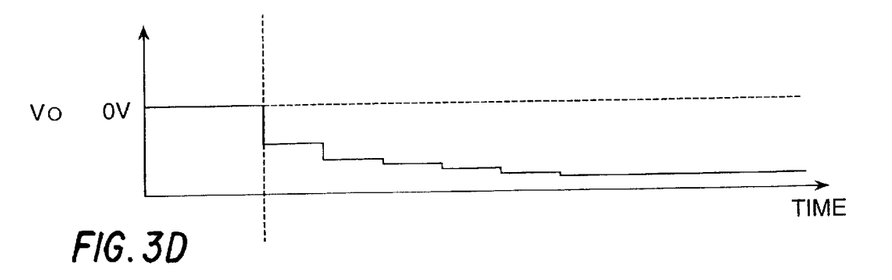
Figure 3E:
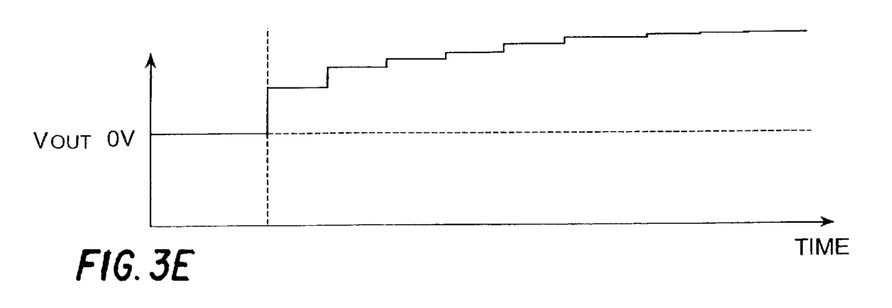

Next, An operational of the embodiment will be explained in more detail, using an equivalent circuit shown in FIG. 2 and a timing chart shown in FIG. 3.

A capacitance detecting circuit 10 of the present embodiment is composed of the dynamic quantity detecting element 5, the reference element 4, the constant voltage source 11, 12, switches 21, 22, 23, 24, 31, 32, the feedback condenser 6, the operation amplifier 7, an inversion device 81 and the output terminal 9.

Here, the switches 21, 23, 31 and the switches 22, 24, 32 correspond to the switch 2 and the switch 3, respectively. The switches 21, 23, 31 are driven by the driving signal ϕ1 and the switches 22, 24, 32 are driven by a reverse phase ϕ1B.

Further, the inversion device 81 is a device for multiplying an input signal by −1, and it can be easily realized by a simple reverse amplifier using an operational amplifier or a switched capacitance circuit. Supposing that an output Vout=0 as an initial value, that is, a detected dynamic quantity is zero, when the switches 21, 23, 31 are in an "on" condition, electric charges are not charged onto both the electrostatic capacitance $C_S$ and $C_R$, however, the instant the switches 22, 24, 32 are turned on, the electrostatic capacitance $C_S$ and $C_R$ are charged. When the capacitance qualities of $C_S$ and $C_R$ are equal, electric current does not flow into the feedback condenser 6 (capacitance $C_F$), therefore, outputs Vo of the operational amplifier 7 and Vout each remain 0 V. This condition is an initial condition of FIG. 3

In the case where force such as pressure is applied and the electrostatic capacitance $C_S$ of the dynamic quantity detecting element 5 becomes larger than the electrostatic capacitance $C_R$ of the reference element 4, more charging current flows to the capacitance $C_S$ flows more, so that a differential between an electric charge quantity charged into the capacitance $C_S$ and an electric charge quantity charged into the capacitance $C_R$ is integrated in the condenser $C_F$ when the timing signal of the driving signal ϕ1B is high. Accordingly, the output V0 changes at the high timing of ϕ1B in FIG. 3. When the switch 24 is off (that is, when ϕ1B is low), the voltage is held and the output V0 becomes constant. The voltage Vo(1) at this time follows the following equation (5):

$$V_0(1) = (C_R - C_S)\text{Vcc}/C_F \tag{5}$$

Since the output voltage Vout becomes −1 multiplied by as Vo, the sensor output Vout follows the following equation (6):

$$\text{Vout}(1) = (C_S - C_R)\text{Vcc}/C_F \tag{6}$$

Accordingly, in the next switching operational step, a wave height of voltage applied on the capacitance $C_R$ does not change to be Vcc, however, the voltage (Vcc−Vout) is applied to the capacitance $C_S$. The operation is expressed by the following equation (7). And, this operation is repeated, and the output voltage Vout charges until the electric charge quantity charged to the capacitance $C_s$ and the electric charge quantity charged to the capacitance $C_R$ becomes equal, and then becomes stable.

$$\text{Vout}(2) = \{C_S(\text{Vcc}-\text{Vout}(1)) - C_R\text{Vcc}\}/C_F \tag{7}$$

In other words, the output changes until electric charge quantities charged and discharged by the capacitance $C_S$ and $C_R$ become equal and electric charges do not flow to the capacitance $C_F$. Therefore, the conditions of stability become the following equation (8), and independent from the integration capacitance $C_F$. Therefore, the final output voltage becomes the equation (3).

$$C_S(\text{Vcc}-\text{Vout}) = C_R\text{Vcc} \tag{8}$$

By constructing such a circuit, it is possible to directly obtain D.C. signals having linearity proportional to $1/C_S$, that is, an air gap d of the electrostatic capacitance changes depending on changes in the dynamic quantity. Therefore, even if an area of the detecting element is made small, it is still possible to detect, and even if a large displacement of the movable electrode is employed for improvement of a ratio of S/N, it is still possible to obtain an output proportional to input pressure.

Further, the feedback current (expressed by an arrow in FIG. 2) flowing into the feedback condenser 6 flows from the constant voltage source 12. Further, as is apparent from the equation (3), the sensor output Vout is finally established without depending on the feedback condenser 6, so that the output is not restricted by the operating speed (response) of the operational amplifier. Further, since the output is not restricted by the response of the operational amplifier, even if a floating capacitance (floating capacitance between the dynamical quantity detecting element and the substrate) affecting the response of the operational amplifier exists, it is possible to detect very small electrostatic capacitance (dynamic quantitative displacement) at high speed with high precision by using detecting driving frequency of high speed.

Further, since the integration capacitance $C_R$ of the feedback condenser 6 is a fixed condenser, it is possible to surely secure the stability of the integrator.

Figure 5:
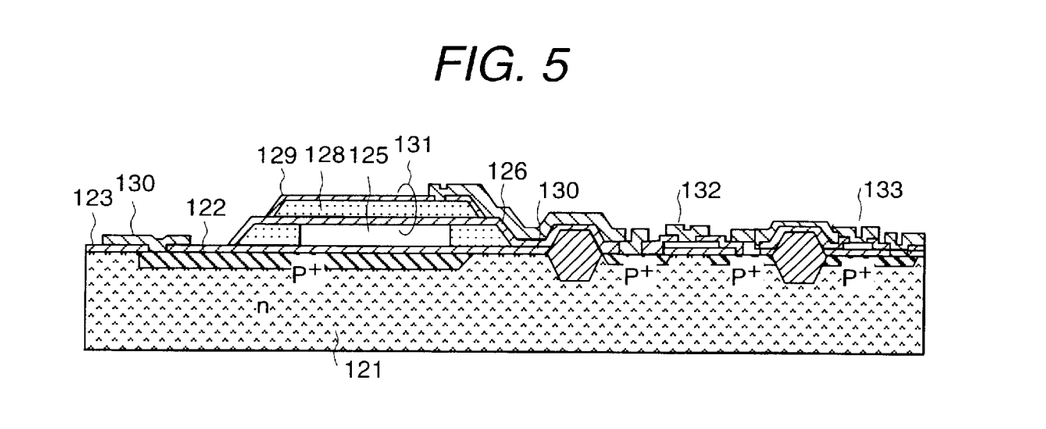
FIG. 5 is a sectional view of the sensor of the first embodiment.

Next, a construction of dynamic quantity sensor of the present embodiment will be explained, referring to FIG. 5.

The dynamic quantity sensor of the present embodiment has a fixed electrode 122 formed by diffusion on a monocrystal silicon substrate 121 and a movable electrode (diaphragm) 131 arranged on the fixed electrode through a protective film 123 such as a nitrified film and an air gap 125, in the same manner as already described of FIG. 7. The movable electrode 131 is composed of protective films 126, 129 such as nitrified films and a polycrystal silicon conductive layer 128.

Signals (electric signals) of electrostatic capacitance between the movable electrode 131 and the fixed electrode 122 fed out through aluminum wiring 130 or the like.

Further, on the substrate 121, a MOS transistor 132, which is an operational amplifier, is formed, and a MOS capacitance 133 which becomes the feedback condenser 6 ($C_F$) also is formed. Although not shown in FIG. 5, a fixed condenser corresponding to the reference element 4 also is formed by surface device processing in the same manner as the above-mentioned capacitance 133.

Figure 4:
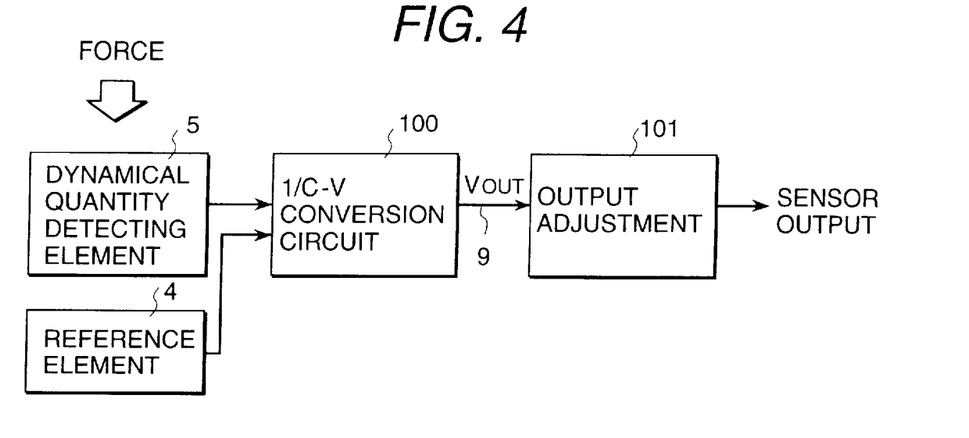
FIG. 4 is a block diagram of the overall construction of the sensor of the first embodiment.

In FIG. 4, a block diagram of the construction of dynamic quantity sensor using the capacitance detecting circuit of the present invention is shown.

The sensor of the present embodiment comprises the dynamic quantity sensing element 5, the reference element 4, an 1/C-V converting circuit 100, which is a capacitance detecting circuit of the present invention, and an output adjustment circuit 101. When force such as pressure is applied on the dynamic quantity detecting element 5, it is converted into a voltage signal Vout by the 1/C-V conversion circuit 100 in a form proportional to a reciprocal of a capacitance value of the dynamic quantity detecting element from the signal and a reference signal, adjusted to be a prescribed output voltage by the output adjustment circuit 101 and then taken out as a sensor signal.

With such a construction, it is possible to easily obtain output signals proportional to input dynamic quantity signals.

Figure 6:
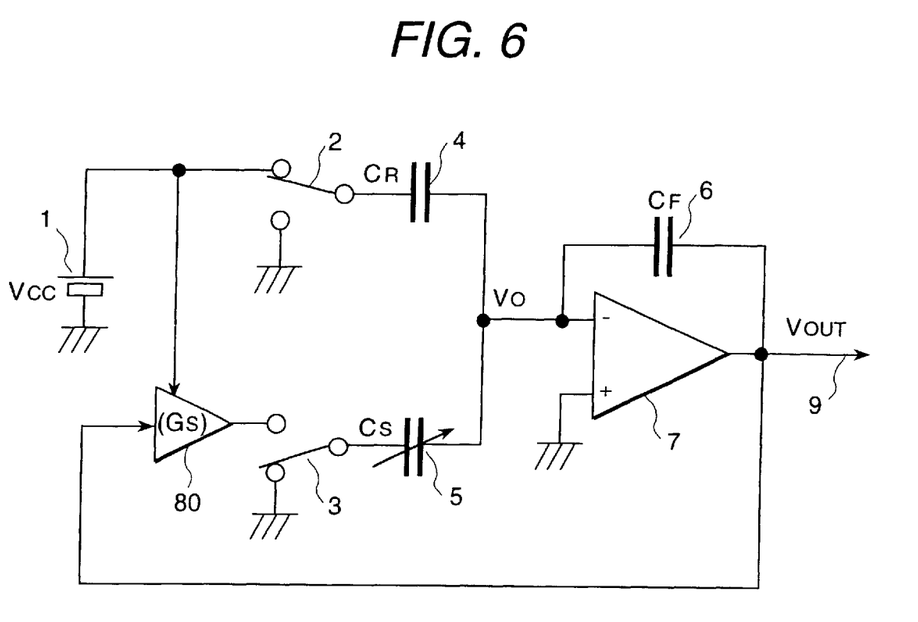
FIG. 6 is a diagram of a circuit of an electrostatic capacitance type dynamic quantity sensor of a second embodiment of the present invention.

FIG. 6 shows a circuit construction of a dynamic quantity sensor of a second embodiment of the present invention.

In FIG. 6, the same symbols as in the embodiment in FIG. 1 denote the same elements. The difference from the embodiment in FIG. 1 is that a multiplier 80 is used instead of the adder 8 and output Vout of the operational amplifier 7 is multiplied by a coefficient Gs in the multiplier 80 and applied to the dynamic quantity detecting element 5 through the changeover switch 3. (A charge discharge circuit is composed of the constant voltage source, switches 2, 3 and multiplier 80 in this embodiment.)

In the present embodiment, also, in the case where the capacitance $C_S$ of the dynamic quantity detecting element 5 is changed by detecting pressure or the like, initially, an operation is taken for the output according to the equation (6), however, in operation, the output voltage Vout changes until the charge quantity charged in the capacitance $C_S$ and the charge quantity charged in the capacitance $C_R$ becomes equal to each other, and then becomes stable.

$$\text{Vout}(2)=(G_S C_S \text{Vout}(1)-C_R \text{Vcc})/C_F \quad (9)$$

A final stabilization condition of the above-mentioned output Vout becomes one expressed by the following equation (10):

$$G_S C_S \text{Vout}=C_R \text{Vcc}$$

$$\text{Vout}=C_R \text{Vcc}/G_S C_S \quad (10)$$

Accordingly, in this embodiment, also, it is possible to directly obtain a D.C. output signal having linearity proportional to $1/C_S$, that is, proportional to an air gap d of the electrostatic capacitance changing according to a change in dynamic quantity, and further, finally, the sensor output Vout is established without depending on the feedback condenser 6, so that the output is not restricted by the operating speed (response) of the operational amplifier. Since it is not restricted by the response of the operational amplifier, even if a floating capacitance (adhered between the dynamic quantity detecting element and the substrate) affecting the response of the operational amplifier exists, it is possible to detect very small electrostatic capacitance (dynamic quantitative displacement) at high speed and with high precision by using high speed detection driving frequency.

The sensors detecting pressure and outputting voltage have been explained up to now, as a circuit of the present invention, however any similar circuit can be applied if it is a sensor which can take up other dynamic quantities such as acceleration, angular speed, etc. as a change of electrostatic capacitance.

As mentioned above, according to the embodiments, in the electrostatic capacitance type dynamic quantity sensor, very small electrostatic capacitance (dynamic quantitative displacement) can be detected by using high speed detection driving frequency without restriction of response of the operational amplifier, stably at high speed without affecting the of floating capacitance, and by converting it straight it into voltage.

Further, it can obtain D.C. output without adding a sample and hold circuit at a rear stage.

What is claimed is:

1. An electrostatic capacitance type dynamic quantity sensor comprising:
   a dynamic quantity detection electrostatic capacitance element having an electrostatic capacitance $C_s$ which changes according to a dynamic quantity,
   a reference electrostatic capacitance element forming a reference electrostatic capacitance $C_R$, and
   a capacitance detection circuit outputting a dynamic quantity detection signal proportional to a reciprocal of the electrostatic capacitance $C_s$ of said dynamic quantity detection electrostatic capacitance element, wherein said sensor has a circuit construction formed so that when said dynamic quantity detection electrostatic capacitance element displaces according to a dynamic quantity, electric charge quantities charged in said dynamic quantity detection electrostatic capacitance element and in said reference electrostatic capacitance element become unbalanced to produce a difference, and an output of said capacitance detection circuit changes according to the difference of electric charge quantity, and a charge and discharge circuit is provided which operates, using the output of said capacitance detection circuit, to change the output until the electric charge quantities in said dynamic quantity detection electrostatic capacitance element and in said reference electrostatic capacitance element become substantially equal.

2. An electrostatic capacitance type dynamic quantity sensor according to claim 1, wherein said capacitance detection circuit has an electric charge integration circuit integrating a difference in electric charge between said electric charge in said dynamic quantity detection electrostatic capacitance element and in said reference electrostatic capacitance elements and outputting said difference, said charge and discharge circuit substracts said integrated output from voltage of a voltage source and adds it to said dynamic quantity detection electrostatic capacitance element, thereby to make the quantities of electric charge charged in said dynamic quantity detection electrostatic capacitance element and in said reference electrostatic capacitance element to be finally equal to each other.

3. An electrostatic capacitance type dynamic quantity sensor according to claim 1, wherein said capacitance detection circuit has an electric charge integration circuit integrating a difference in electric charge between said electric charge in said dynamic quantity detection electrostatic capacitance element and in said reference electrostatic capacitance element, and outputting said difference, said charge and discharge circuit multiplies said integrated output and adds it to said dynamic quantity detection electrostatic capacitance element, thereby to make the quantities of electric charge charged in said dynamic quantity detection electrostatic capacitance element and in said reference electrostatic capacitance element to be finally equal to each other.

4. An electrostatic capacitance type dynamic quantity sensor according to claim 2, wherein said dynamic quantity detection electrostatic capacitance element and said reference electrostatic capacitance element are connected in series, said capacitance detection circuit comprises an operational amplifier having a reverse input terminal connection to a common line connecting between said dynamic quantity detection electrostatic capacitance element and said reference electrostatic capacitance element, and a feedback condenser connected between said reverse input terminal and an output terminal of said operational amplifier, wherein said feedback condenser becomes an element of said electric charge integration circuit and an output of said capacitance detection circuit does not depend on a capacitance value of said feedback condenser when the quantities of electric charge charged in said dynamic quantity detection electrostatic capacitance element and in said reference electrostatic capacitance element become equal to each other.

5. An electrostatic capacitance type dynamic quantity sensor according to claim 3, wherein said dynamic quantity detection electrostatic capacitance element and said reference electrostatic capacitance element are connected in series, said capacitance detection circuit comprises an operational amplifier having a reverse input terminal connection to a common line connecting between said dynamic quantity detection electrostatic capacitance element and said reference electrostatic capacitance element, and a feedback condenser connected between said reverse input terminal and an output terminal of said operational amplifier, wherein said feedback condenser becomes an element of said electric charge integration circuit and an output of said capacitance detection circuit does not depend on a capacitance value of said feedback condenser when the quantities of electric charge charged in said dynamic quantity detection electrostatic capacitance element and in said reference electrostatic capacitance element become equal to each other.

* * * * *